May 17, 1960 W. A. BLACK 2,936,576
HOT WIRE INITIATOR

Filed Nov. 30, 1953 2 Sheets-Sheet 1

INVENTOR.
WILLIAM A. BLACK
BY
*H.H.Hulse*
Atty.

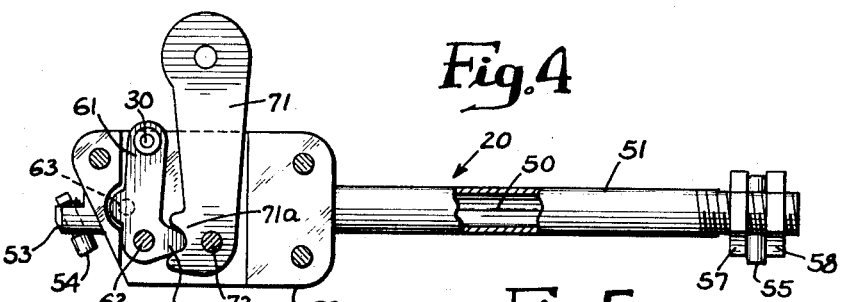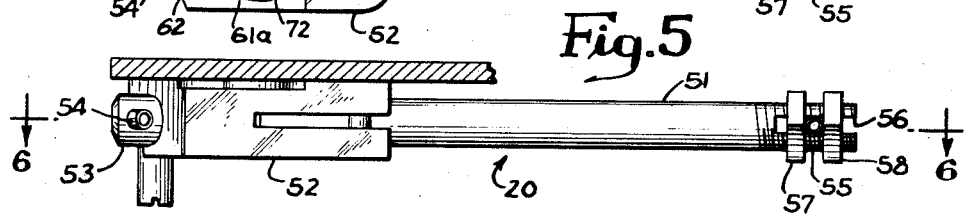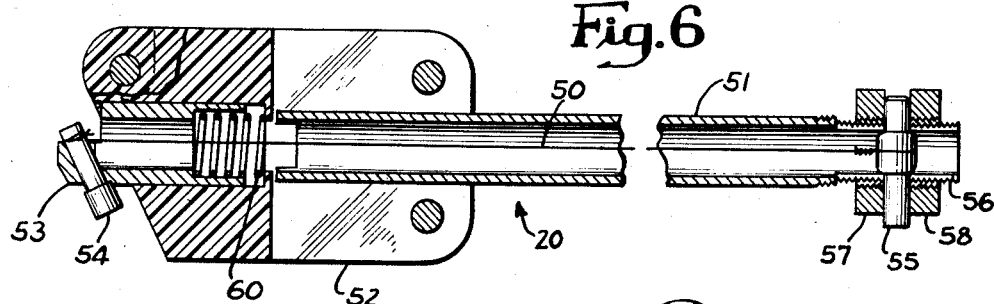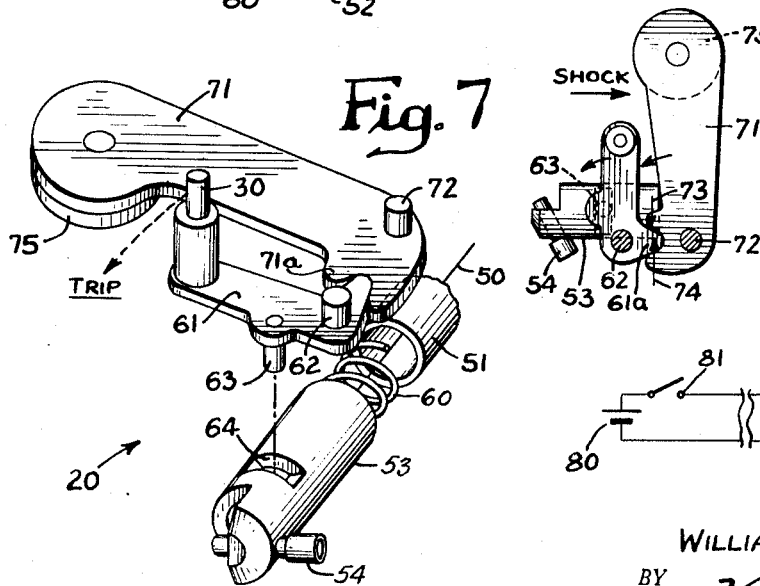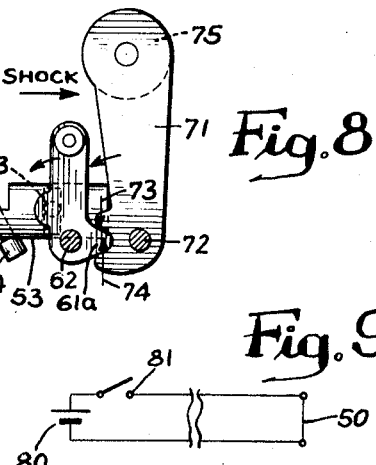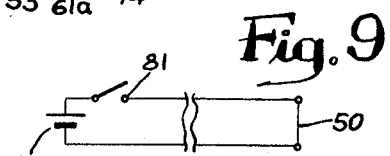

United States Patent Office 2,936,576
Patented May 17, 1960

2,936,576
HOT WIRE INITIATOR

William A. Black, Montclair, N.J., assignor to General Time Corporation, New York, N.Y., a corporation of Delaware Application November 30, 1953, Serial No. 395,126

5 Claims. (Cl. 60—23)

The present invention relates to remote operating devices, and more particularly to means for electrically initiating the operation of remote clockwork or the like.

It is an object of the present invention to provide a remote operating device for use in controlling ordnance equipment, which is positive and reliable in operation, even in the face of extreme shock and vibration. It is another object to provide an electrically operated initiating device which does not create a magnetic field and which may therefore be employed in close association with magnetically sensitive devices of all kinds. It is a related and equally important object to provide a device which is not only non-magnetic but which avoids the use of magnetically permeable material and therefore is incapable of upsetting or affecting existing magnetic fields. It is a further object to provide a device of the above type which will operate satisfactorily over a wide voltage range, and which overcomes the disadvantages normally associated with relays, solenoids or other magnetic devices. It is a more specific object related to the foregoing to provide a thermally operated tripping device which is independent of changes in ambient temperature.

It is another object of the invention to provide a remote operating device which is capable of producing large operating forces and which is substantially free of frictional effects. It is a more detailed object of the invention to provide an electrically operated mechanism capable of performing a plurality of functions simultaneously, each of which requires a substantial amount of energy, but which nevertheless requires only small triggering forces to be supplied from the electrical control circuit, so that the device may be reliably actuated using only low values of current.

Finally, it is an object to provide an electrical device for performing a function remotely which is simple and inexpensive of construction, light in weight, easily adjusted and which, once adjusted, requires no further care or maintenance.

Other objects and advantages of the invention will become apparent upon reading the attached detailed description and upon reference to the drawings, in which:

Fig. 4 is a plan view of the electric actuator employed in Fig. 1.

Fig. 5 is a side elevation of the actuator shown in Fig. 4.

Fig. 6 is a section taken along the line 6—6 in Fig. 5.

Fig. 7 is an exploded fragmentary perspective of the actuator and associated levers.

Fig. 8 is a diagram showing the behavior of the levers in Fig. 7 under applied shock.

Fig. 9 is a simplified control circuit.

While the invention has been described herein in connection with a preferred embodiment, it will be understood that I do not intend to limit the invention thereto, but intend to cover all modifications and alternative constructions which may be included within the spirit and scope of the appended claims.

In copending application Serial No. 398,342, filed December 15, 1953, there is disclosed a timing mechanism including a plurality of switches and spring-driven clockwork for operating them in sequence. It is the purpose of the present application to describe a remotely controlled initiating device for setting the clockwork into motion and thereby to begin the timing cycle.

Figure 1:
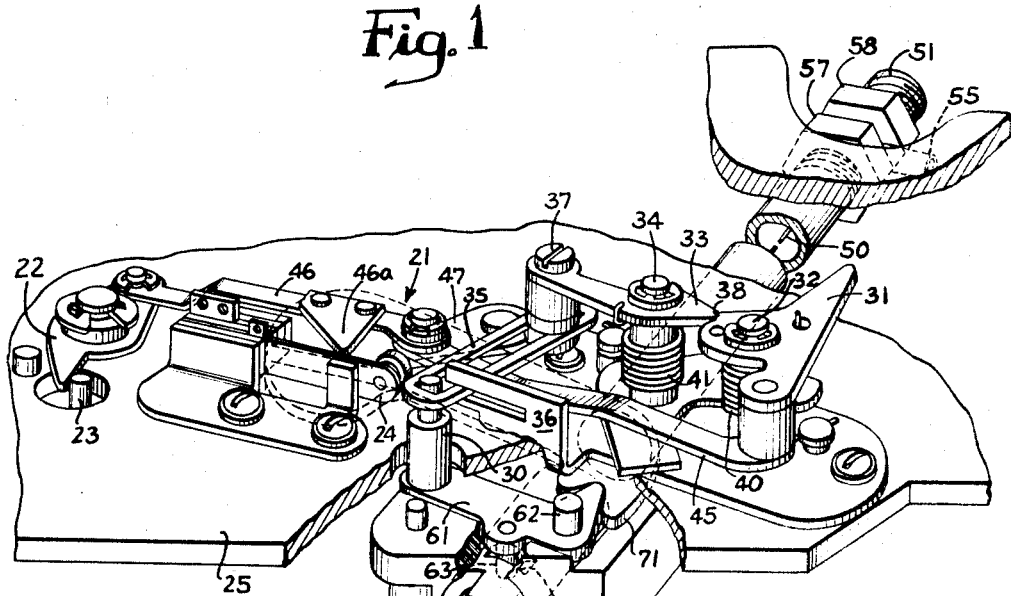
Figure 1 is a general perspective of a remote operating device constructed in accordance with the present invention, with certain parts broken away to show the details of construction.

Referring to Figure 1, the present device includes an actuator indicated generally at 20, which is electrically operated and which serves to trigger operation of an initiating mechanism 21. Such initiating mechanism includes a blocking lever 22, which moves into and out of blocking engagement relative to a vibrating escapement member 23. It will be understood that the escapement member 23 forms a part of a spring-wound timing mechanism which is not shown, but which is covered in the above-mentioned application. As will be covered in detail, electrical actuation of the actuator 20 causes the blocking lever 22 to move to a "clear" position to start the cycle. A switch 24 is also operated incident thereto. All of the elements thus far described are mounted on a common mounting plate 25.

Figure 2:
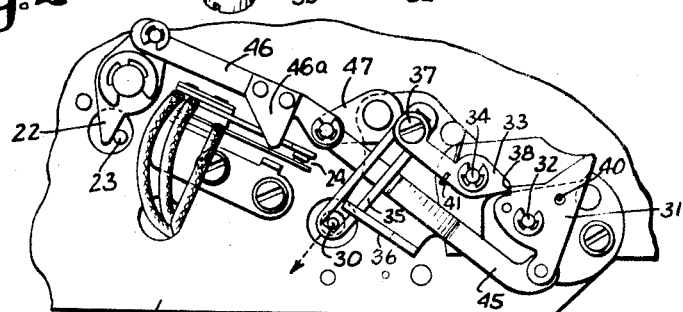
Fig. 2 is a fragmentary plan view of the cocking mechanism in the cocked condition.
Figure 3:
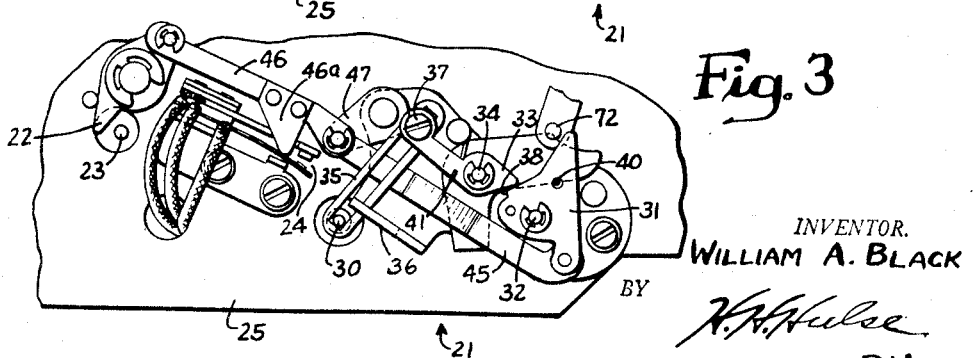
Fig. 3 shows the mechanism of Fig. 2 after release and prior to recocking.

In accordance with the present invention, means are provided in the initiating mechanism 21 for storing manual energy which is released by movement of a trigger element on the actuator 20, the trigger element being indicated at 30 in the drawings. The actuator 20 will be discussed at a later point and it will suffice for the present to say that applying current thereto causes the trigger element 30 to move in the direction indicated by the dotted arrow in Fig. 2. Assuming that the mechanism 21 is in its cocked condition, such movement causes the mechanism to be tripped. The cocked and tripped conditions of the mechanism 21 are shown in Figs. 2 and 3, respectively. As illustrated in Fig. 2, the mechanism includes an operating member 31 mounted for pivoting about an axis 32 and which cooperates with a pivoted pawl 33 mounted on an axis 34. The end of the pivoted pawl is connected to an adjustable link 35 which, as shown, engages the trigger 30 on the actuator. The link 35 is supported in a slotted guide 36 and adjustment of the effective length of the link is permitted by a clamping screw 37.

When the mechanism is in cocked position, the pawl 33 engages a stop surface 38 on the operating member. Such stop surface is biased against the pawl by a biasing spring 40 and the pawl itself is biased in the locking direction by a spring 41. The energy required to release the pawl is nevertheless low, the stop surface 38 being arranged approximately at right angles to the direction of thrust. Connected to the operating member 31 is a link 45 which in turn is connected to a link 46 coupled to the blocking arm 22. The links 45, 46 are guided for a combination of endwise and lateral movement by an auxiliary link 47, to produce side thrust of the link 46 which is transmitted through an insulated finger 46a thereon for operating the switch 24.

When the mechanism shown in Fig. 2 is triggered by movement of the trigger 30 in the direction indicated, the pivoted pawl 33 rides out of engagement with the stop surface 38 and the operating member 31 rotates counterclockwise under the influence of the biasing spring 40, and into the position shown in Fig. 3. Such movement of the operating member is accompanied by endwise movement of the links 45, 46, which in turn produces rotation of the blocking member 22 to free the escapement and thereby start the clockwork. The finger 46a on the lever 46 operates the switch 24 which is connected to an auxiliary circuit. It will be apparent from the discussion thus far that all of the energy required to operate the blocking lever and switch is obtained from the energy which has been stored in the biasing spring 40, and the trigger is called upon only to rotate the pawl member out of engagement with the operating member.

In order to understand the construction of the actuator 20, reference may next be made to Figs. 4, 5 and 6. In accordance with the present invention, the actuator includes a temperature-responsive wire which is strung centrally in a tube and which is connected at one end to an outwardly biased member which moves in response to the current applied to the wire. In the present instance the wire indicated at 50 is mounted in a tube 51 which is in turn anchored at one end to a frame 52. Slidably received in the frame 52 and coaxial with the tube 51 is a movable member 53 to which the wire is attached, being anchored to a post 54 thereon. At its opposite end the wire 50 is anchored by a pin 55 which is received in a slot 56, the pin 55 being securely held between two adjusting nuts 57, 58. The wire 50 is normally kept taut by the biasing spring 60 which acts upon the slidable member 53, tending to push it outwardly of the frame 52.

It will be apparent to one skilled in the art from the discussion thus far that the movable member 53 will occupy a fixed position; however, upon flow of current through the wire 50, the wire will tend to expand and the member 53 will move outwardly under the force of the biasing spring 60. In order to insure appreciable movement, the wire 50 is preferably made of a metal or alloy having a high coefficient of thermal expansion combined with high strength and high resistivity. I have found that Nichrome wire, which is a well known alloy containing nickel and chromium, possesses these characteristics to the appropriate degree, although it will be apparent that other resistance wires may be substituted if desired.

The ambient temperature characteristics of the present device may be next discussed, since changes in ambient temperature affect the "normal" length of the wire 50. Nevertheless, in accordance with one of the aspects of the invention the tube 51 is made of material such that the total expansion over the mounting length of the wire 50 upon a given change in ambient temperature is approximately equal to the change in length of the wire itself. Such condition is met by using a brass tube with the Nichrome wire. This effectively compensates for changes in ambient temperature sufficient to include all normal uses to which the device may be put. Stated another way, the device thus far described is sensitive only to differential changes in the temperature of the wire 50 brought about by the flow of control current therein.

For transmitting movement of the output member 53 to the trigger 30, a lever 61 is provided having a pivot 62 and having a post 63 which extends into engagement with the member 53, being received in a slot 64 therein (Fig. 7). It will be apparent that upon elongation of the wire 50, counterclockwise movement of the lever 61 will occur, causing the trigger 30 to tension the link 35, thereby tripping the pawl 33. The range of movement of the trigger 30 may be set simply by adjusting the nuts 57, 58 which anchor the remote end of the temperature-responsive wire 50. Furthermore, the point in the movement of the link 35 at which the pawl 33 is tripped, may be adjusted by changing the location of the pivot point between the link 35 and the pawl. To this end, the link 35 is of open, slotted construction, the point of pivoting being adjustable therealong by means of the clamping screw 37.

It is one of the further features of the present construction that the device is substantially immune to the effects of shock and vibration, even where force is applied on the order of 1,000 g. Thus, means are provided for counter-balancing any accelerational forces which may be set up in the movable member 53 and lever 61. This is accomplished in the present instance by providing an auxiliary lever 71 lying in the plane of the lever 61 and coupled thereto in such fashion that a shock from any direction sets up forces which are equal to and opposite one another, resulting in zero net force. Accordingly, the auxiliary lever 71 is pivoted at a pivot 72, and has a laterally extending arm 71a which registers with and engages a laterally extending arm 61a on the lever 61, thereby providing jackknifing between the two levers. Behavior of the above construction under shock may be clearly illustrated by reference to Fig. 8, in which the shock vector is represented by the solid arrow. As a result of the shock, both levers 61 and 71 tend to rotate in a counterclockwise direction about their respective pivots. It will be apparent, however, that any tendency toward movement results in setting up equal and opposite force vectors 73, 74, as shown, thereby maintaining all of the movable elements in status quo. Since it is necessary to counterbalance not only the lever 61, but also the movable member 53 connected thereto, the lever 71 may be provided with a disc-shaped weight 75 at its outer end. Adjustment and positioning of such weight is well within the capability of one skilled in this art. It can be shown that the shock-proofness provided by the above construction is effective in all directions of shock lying in the plane of the levers 61, 71. Shock components perpendicular to the plane of the levers may be disregarded, since they do not produce any tendency toward movement of the trigger 30.

It will be apparent that the circuit for controlling flow of current to the wire 50 may be simple indeed, being illustrated in Fig. 9, including a current source 80, and switch 81. The distance between the control station and the initiating device may be as great as desired, since the amount of actuating current is low and since the amount of voltage drop in the control lines is not a critical factor. A wide range of current is sufficient to heat the wire 50, particularly since the wire is shielded from heat loss by the tube 51. Any over-voltage simply has the effect of speeding up the tripping operation. In the extreme case excessive current may cause burn-out of the wire 50, resulting, in any event, in outward movement of the member 53 and in quick and positive actuation of the triggered mechanism.

One of the primary advantages of the present construction is that it overcomes the disadvantages normally associated with relays, solenoids, and other magnetic types of actuating devices. Significantly, the device does not create a magnetic field, nor does it tend to deform or otherwise offset existing fields, and it may therefore be employed in close proximity to sensitive magnetic devices used for detecting changes in magnetic fields and the like. If desired, the supporting tube 51 may itself serve as a return path for the current, thereby neutralizing any extremely small field which might be set up by the current flowing in the wire 50.

A factor which contributes to the high sensitivity is that friction in the actuator itself is reduced to a minimum. Thus, it will be noted that the force applied by the wire 50 to the supporting member 53 is purely axial and the opposing force of the spring 60 is similarly of an axial nature, thereby avoiding any side thrust between the member 53 and its supporting frame 52. The frictional loading presented by the two levers 61, 71 is negligible, since the levers are freely pivoted and since the force multiplication is small.

In order to cock the initiating mechanism, the cocking lever is engaged by a manually operated arm 72 (Fig. 3) which wipingly rotates in a counterclockwise direction incident to winding, the means for rotating the arm 72 being set forth in some detail in the above copending case. This tensions the biasing spring 40 and restores the mechanism from the condition set forth in Fig. 3 to that shown in Fig. 2. It is to be particularly noted that the frictional forces in the initiating mechanism itself need not be overcome by the actuator 20 and are overcome instead by the energy manually stored in the biasing spring 40.

I claim as my invention:

1. In a remote operating device, the combination comprising a thermally expansive resistor wire, a frame providing a longitudinal mounting member extending therefrom, a fixed support for anchoring said wire at a remote point on said mounting member, a movable support mounted on said frame for movement endwise with respect to said resistor wire, means for biasing the movable support to maintain the wire taut, said longitudinal member being constructed of material which expands slightly upon an increase in ambient temperature, and an electric control circuit for supplying current to said resistor wire.

2. In a remote operating device, the combination comprising a thermally expansive resistor wire, a frame providing a longitudinal mounting member extending therefrom, a fixed support for anchoring said wire at the end of said mounting member, a movable support mounted on said frame for movement endwise with respect to said resistor wire, means for biasing the movable support to maintain the wire taut, said longitudinal member having a change in length which is substantially equal to the expansion of the wire upon a given change in ambient temperature, and an electric control circuit for supplying current to said resistor wire.

3. In a remote control device, a single-wall tube supported at one end, a thermally responsive resistor wire within said tube having one end anchored at the unsupported end of said tube, a movable support for anchoring the other end of said wire, said support being slidably mounted with respect to said tube and biased to maintain said wire taut, an electric control circuit for selectively supplying current to said resistor wire, and control means operated by movement of said support upon expansion of said wire when heated by current in said circuit, said wire and said tube being composed of materials having substantially equal coefficients of thermal expansion to prevent operation of said control means by changes in ambient temperature.

4. In a remote operating device, the combination comprising a thermally expansive resistor wire, a frame providing a longitudinal mounting member extending therefrom, a fixed support for anchoring said wire at the end of said mounting member, a movable support mounted on said frame for movement endwise with respect to said resistor wire, means for biasing the movable support to maintain the wire taut, an electric control circuit for supplying current to said resistor wire, a lever pivoted in the plane of movement of said movable support, said lever being weighted at one end and connected to said support so that movement of the support is accompanied by directly opposite movement of the weight, said weight being sufficient to respond to a shock force and exactly counterbalance the effect of that shock force on said support so that the operating device is shock-proof.

5. In a remote operating device, the combination comprising a thermally expansive resistor wire, a frame providing a longitudinal mounting member extending therefrom, a fixed support for anchoring said wire at the end of said mounting member, a movable support mounted on said frame for movement endwise with respect to said resistor wire, means for biasing the movable support to maintain the wire taut, an electric control circuit for supplying current to said resistor wire, said longitudinal member having a change of length which is substantially equal to the expansion of the wire upon a given change of ambient temperature, a lever pivoted in the plane of movement of said movable support, said lever being weighted at one end and connected to said support so that movement of the support is accompanied by directly opposite movement of the weight, said weight being sufficient to respond to a shock force and exactly counterbalance the effect of that force on said support, the device thus being both shock-proof and unaffected by ambient temperature changes.

References Cited in the file of this patent

UNITED STATES PATENTS

| | | |
|---|---|---|
| 639,688 | Robertson | Dec. 19, 1899 |
| 859,899 | Berens | July 9, 1907 |
| 959,827 | Wohl et al. | May 31, 1910 |
| 1,610,552 | James | Dec. 14, 1926 |
| 1,773,708 | Whittingham | Aug. 19, 1930 |
| 1,804,709 | Shoenberg | May 12, 1931 |
| 2,203,719 | Crane | June 11, 1940 |
| 2,306,509 | Talmey | Dec. 29, 1942 |
| 2,588,239 | Hopton | Mar. 4, 1952 |